United States Patent
Li et al.

(10) Patent No.: US 7,183,370 B2
(45) Date of Patent: Feb. 27, 2007

(54) PHOSPHONIC-ACID GRAFTED HYBRID INORGANIC-ORGANIC PROTON ELECTROLYTE MEMBRANES (PEMS)

(75) Inventors: Siwen Li, Atlanta, GA (US); Meilin Liu, Alpharetta, GA (US); Kohei Hase, Aichi (JP); Masatsugu Nakanishi, Shizuoka (JP); Wen Li, Ann Arbor, MI (US); Junzo Ukai, Novi, MI (US)

(73) Assignee: Toyota Technical Center USA, Inc, Ann Arbor, MI (US)

( * ) Notice: Subject to any disclaimer, the term of this patent is extended or adjusted under 35 U.S.C. 154(b) by 10 days.

(21) Appl. No.: 10/938,268

(22) Filed: Sep. 10, 2004

(65) Prior Publication Data

US 2005/0113547 A1 May 26, 2005

Related U.S. Application Data

(60) Provisional application No. 60/511,836, filed on Oct. 16, 2003, provisional application No. 60/502,178, filed on Sep. 11, 2003.

(51) Int. Cl.
*C08G 77/30* (2006.01)

(52) U.S. Cl. .......................... 528/30; 528/35; 528/42; 525/431; 525/102; 525/452; 525/474; 525/477

(58) Field of Classification Search ................. 528/39, 528/35, 42; 525/102, 431, 452, 474, 477
See application file for complete search history.

(56) References Cited

U.S. PATENT DOCUMENTS

| | | | |
|---|---|---|---|
| 3,122,581 A | 2/1964 | Pike | 260/448.8 |
| 3,408,420 A | 10/1968 | Wiggill | 260/827 |
| 4,707,517 A | 11/1987 | Bullen et al. | 525/72 |
| 4,923,950 A | 5/1990 | Ravaine et al. | 528/38 |
| 4,965,334 A * | 10/1990 | Mohr et al. | 528/34 |
| 5,283,310 A | 2/1994 | Armand et al. | 528/30 |
| 5,389,726 A | 2/1995 | Sojka | 525/100 |
| 5,453,467 A | 9/1995 | Bamford et al. | 525/287 |
| 5,627,296 A | 5/1997 | Dauth et al. | 556/405 |
| 5,656,386 A | 8/1997 | Scherer et al. | 429/33 |
| 5,840,800 A | 11/1998 | Joffre et al. | 524/806 |
| 5,998,559 A | 12/1999 | Narang et al. | 528/14 |
| 6,124,060 A | 9/2000 | Akita et al. | 429/307 |
| 6,201,064 B1 | 3/2001 | Aoyama et al. | 525/63 |
| 6,264,857 B1 | 7/2001 | Kreuer et al. | 252/500 |
| 6,310,110 B1 | 10/2001 | Markowitz et al. | 521/99 |
| 6,376,129 B2 | 4/2002 | Faure et al. | 429/306 |
| 6,423,784 B1 | 7/2002 | Hamrock et al. | 525/326.2 |
| 6,488,343 B1 | 12/2002 | Eberling et al. | 303/15 |
| 6,531,539 B2 | 3/2003 | Krafczyk et al. | 524/588 |
| 6,680,138 B1 | 1/2004 | Honma et al. | 429/33 |
| 6,713,643 B2 | 3/2004 | Pinnavaia et al. | 556/450 |
| 6,716,908 B2 | 4/2004 | Lomas et al. | 524/588 |
| 6,716,920 B2 | 4/2004 | Arhart et al. | 525/102 |
| 6,750,352 B2 | 6/2004 | Ono et al. | 548/341.5 |
| 6,756,436 B2 | 6/2004 | Rajagopalan et al. | 524/322 |
| 2002/0127474 A1 | 9/2002 | Fleischer et al. | 429/309 |
| 2003/0144450 A1 | 7/2003 | Jacob et al. | 528/10 |
| 2004/0013925 A1 | 1/2004 | Komiya | 429/33 |
| 2004/0062970 A1* | 4/2004 | Nomura et al. | 429/33 |
| 2004/0138490 A1 | 7/2004 | Wolter | 556/405 |

FOREIGN PATENT DOCUMENTS

| | | |
|---|---|---|
| WO | WO 2001/83092 A1 | 8/2001 |
| WO | WO 2001/84657 A2 | 11/2001 |
| WO | 03/041091 * | 5/2003 |
| WO | WO 2003/067691 A2 | 8/2003 |
| WO | WO 2004/005380 A1 | 1/2004 |

OTHER PUBLICATIONS

M. Rikukawa, K. Sanui, "Proton-conducting polymer electrolyte membranes based on hydrocarbon polymers," Prog. Polym. Sci. 25 (2000) 1463-1502, Department of Chemistry, Sophia University, 7-1 Kioi-cho, Chiyoda-ku, Tokyo 102, Japan.

Michael Popall and Xin-Min Du, "Inorganic-Organic Copolymers as Solid State Ionic Conductors with Grafted Anions," Electrochimica Acta, vol. 40, No. 13-14, pp. 2305-2308, 1995.

* cited by examiner

*Primary Examiner*—Margaret G. Moore
(74) *Attorney, Agent, or Firm*—Gifford, Krass, Groh, Sprinkle, Anderson & Citkowski, P.C.

(57) ABSTRACT

A proton conducting polymer is formed by the copolymerization of a plurality of compounds, including a silicon compound comprising an organic chain, and a compound including at least one acid group. The polymer comprises a hybrid organic-inorganic matrix having acid groups linked through a linking group. The linking group may include one or more electron withdrawing groups. The electron withdrawing group may be a halogen.

44 Claims, 4 Drawing Sheets

PHOSPHONIC-ACID GRAFTED HYBRID INORGANIC-ORGANIC PROTON ELECTROLYTE MEMBRANES (PEMS)

REFERENCE TO RELATED APPLICATION

This application claims priority from U.S. provisional patent applications Ser. No. 60/502,178, filed Sep. 11, 2003 and Ser. No. 60/511,836, filed Oct. 16, 2003, the entire content of both of which are incorporated herein by reference.

FIELD OF THE INVENTION

The present invention relates to polymers, in particular to proton conducting polymers which may be used in polymer electrolyte membranes, for example for use in fuel cells.

BACKGROUND OF THE INVENTION

Proton electrolyte membranes (PEMs) are a critical component in fuel cells. While various electrolyte membranes have been studied in many years, the existing membranes are still inadequate in performance for many applications. Polymer proton conductors, including perfluorosulfonic polymers (such as Nafion®), have good chemical, electrochemical and mechanical stability, but they have serious disadvantages, such as high cost, dimensional changes with water contents, poor hydrophilicity, and large amount of fuel crossover.

These limitations have stimulated the development of many other proton conducting membranes, including polymer proton electrolytes with nanometer-sized hygroscopic metal oxides, polymer membranes having free phosphoric acid ($H_3PO_4$), and hybrid inorganic-organic proton conducting membranes doped with proton-conductive components. See M. Rikukawa et al, Prog. Polym. Sci., 25, p 1463 (2000).

Existing hybrid inorganic-organic copolymers do not have satisfactory properties for practical application in fuel cells or other electrochemical devices. For example, membranes containing free $H_3PO_4$ have a serious problem of the $H_3PO_4$ leaching out, and thus can be used only in an environment with low relative humidity. Sulfonated aromatic polymer membranes and sulfonic-group-grafted hybrid inorganic-organic copolymer membranes displayed high proton conductivities under conditions of high relative humidity and below 100° C. However, they are usually brittle, or soluble in water at high sulfonation level. Further, sulfonic-group-grafted hybrid inorganic-organic copolymer membranes have very limited thermal stability; they usually decompose above 100° C. because of the oxidation of the sulfonic acid groups (See M. Popall et al, Electrochim. Acta, 40, p 2305 (1995)).

Hence new proton conducting membranes are needed, having high proton conductivity, good mechanical properties and adequate thermal stability.

SUMMARY OF THE INVENTION

A proton conducting polymer is formed by the copolymerization of a plurality of compounds, including a silicon compound comprising an organic chain, and a compound including at least one acid group. The polymer comprises a hybrid organic-inorganic matrix having acid groups linked through a linking group. The linking group may include one or more electron withdrawing groups. The electron withdrawing group may be a halogen.

DETAILED DESCRIPTION OF THE INVENTION

An improved proton-conducting polymer comprises a three-dimensional organic-inorganic hybrid matrix including silicon atoms, oxygen atoms, and organic chains. Acid groups are linked to the matrix through linking groups. The linking groups may contain one or more electron withdrawing groups to enhance the acidity of the acid groups.

An example polymer comprises the reaction product of a plurality of silicon compounds (each including at least one silicon atom). For example, the silicon compounds can include a first silicon compound having an organic chain, the organic chain having at least two carbon atoms, and a second silicon compound including at least one acid group, the acid group being linked to a silicon atom of the second silicon compound through a linking group.

The plurality of silicon compounds may further include a third silicon compound, for example a silane derivative having at least one hydrolyzable group, such as a tetraalkloxysilane (such as tetraethoxysilane) or trialkoxysilane.

Other example polymers comprise the reaction product of a first silicon compound including an organic chain, a second silicon compound including a first functional group, and a third compound including a second functional group and an acid group. During copolymer formation, silicon containing groups are hydrolyzed to form an inorganic-organic hybrid matrix containing silicon atoms, oxygen atoms, and organic chains. In addition, the first and second functional groups interact to bind the acid group to the matrix.

Organic Chains in Hybrid Matrix

A silicon compound can be provided containing one or more organic chains. After copolymerization, an inorganic-organic hybrid matrix is formed including organic chains, silicon atoms, and oxygen atoms.

For example, a silicon compound may be providing having an organic chain having a first end and a second end, the first end being connected to a first silicon-containing group (such as a first silyl group), the second end being connected to a second silicon containing group (such as a second silyl group).

Examples of organic chain containing silicon compounds include bis(alkoxysilyl)-terminated polymers, oligomers, and/or short chain organics, such as compounds of the form $Si(A_{3-x}B_x)$—R—$Si(A_{3-x}B_x)$, where A can be an alkoxy group, hydroxyl group, or other hydrolyzable substituent, B can be an alkyl group or hydrogen, and where R is an organic chain. Other examples are discussed herein.

In other examples, the first end of the organic chain is connected to a silyl group, the second end is connected to another functional group. Functional groups include vinyl, —CH=$CH_2$, acrylate, methacrylate, epoxy, urethane, styrene, and other polymerizable groups, or groups that interact through, for example, addition reactions. Other examples of functional groups include hydroxyl (—OH), halogen (—X), thiol (—SH), amines (such as —$NH_2$), and other functional groups known in the chemistry arts. Functional groups include groups that can be polymerizable with each other, or copolymerizable with other components, such as functional groups on other precursors such as other organosilicon precursors.

Examples of organic chains include polypropylene oxide, polytetraethylene oxide, poly(1-butene), polyethylene, polypropylene, polyvinylidene fluoride, polystyrene, polytetrafluoroethylene, polyvinylchloride, and polyvinylalcohol. Other examples include, straight chain alkyl groups with 2–20 carbon atoms, other chains comprising carbon, hydrogen, and optionally oxygen, chains including cyclic groups, branched chains, and other chains known in the chemical arts. Organic chains may also include hydrocarbons (or other organic chains) substituted with N, O, or S. Other chains can also be used, such as polysiloxane chains.

Hence, an example copolymer comprises an organic-inorganic hybrid matrix, including silicon atoms, oxygen atoms, and organic chains, and an acid group chemically linked to the organic-inorganic matrix by a linking group. The organic-inorganic hybrid matrix can be in the form of an organically modified silica compound.

In other examples, additional organosilanes, such as two or more flexibly interconnected silane groups, for example two silane groups interconnected through an alkyl chain having 2–20 carbon atoms, can be used in preparation of the membrane, for example to improve mechanical properties.

Acid Groups

In examples described below, the acid group illustrated is often a phosphonic acid group. However, other acid groups can be used, such as other phosphorus-containing acid groups (such as phosphonic acid derivatives), sulfur-containing acid groups, boron-containing acid groups, other inorganic acid groups, or other organic acid groups.

For example, a proton conducting membrane may include a hybrid inorganic-organic matrix having one or more acid group species bound to the matrix. The acid group can be an inorganic acid group such as a phosphorus-containing acid group (such as phosphonic acid group, —$PO_3H$, or equivalently, phophoryl group), sulfur-containing acid group (such as a sulfonic acid group, —$SO_3H$), boron-containing acid group (such as boronic acid group, —$B(OH)_2$), and the like.

The acid group can also be an organic acid group such as a carboxylic acid group (—COOH). Two or more different acid groups may be provided, linked to a hybrid inorganic-organic matrix by, for example, first and second linking groups, which themselves may be the same or different. In other examples, one or more species of acid group, and one or more species of proton solvent groups (such as a nitrogen-containing heterocycle), can both be bound to the inorganic-organic matrix.

In certain environments, the dissociable proton of an acid group may be replaced by another ion, such as an alkali metal ion, other metal ion, ammonium ion, or the like.

Acid group containing silicon compounds (such as silane derivatives) can be used in a copolymerization reaction with other compounds described herein. Acid group containing silicon compounds include PETHS, phosphoryl ethyl trihydroxyl silane (and alkoxy analogs), acid-substituted phenyl substituted trialkoxysilanes (such as SPS ($Si(EtO)_3$—Ph—$SO_2OH$), other compounds discussed herein, and the like.

Acid group containing silicon compounds may further include a functional group, such as a polymerizable group, and/or a group allowing grafting to an organic polymer chain.

Linking Group Connecting Acid Group to Matrix

A linking group, connecting an acid group to the inorganic-organic hybrid matrix, can be an organic linking group such as a hydrocarbon chain, such as an alkyl chain. A linking group may also contain an electron withdrawing group so as to enhance the acidity of the acid group. The electron withdrawing group can be a halogen atom, such as a chlorine or fluorine atom.

For example, if the acid group is attached to a specific carbon atom of the linking group, that specific carbon atom and/or adjacent carbon atom(s) can also be attached to an electron-withdrawing group. Hence, one or more carbon atoms within the linking group can be halogenated (e.g. chlorinated and/or fluorinated).

For example, if the linking group is an alkyl chain, the alkyl chain may be at least partially halogenated, or completely halogenated. For example, the acid group may be attached to a fluorinated or chlorinated carbon atom.

The linking group can be, for example, an aliphatic hydrocarbon group having 2 to 20 carbon atoms (such as an alkyl or alkene), a phenyl group or derivative, or a methacryl (or acryl) containing aliphatic group. The linking group may be substituted with or otherwise include, for example, one or more O, N, S, or halogen (F,Cl,Br, I) atoms.

In another example, the acid group is a phosphorus-containing acid, such as a phosphonic group, the phosphorus atom of the phosphonic acid group is bound to a carbon atom of the linking group, and the carbon atom of the linking group is fluorinated.

In other examples, the carbon adjacent to a carboxylic acid may be linked to an electron withdrawing group, for example —$CF_2COOH$.

An acid group may be connected through an linking group to the hybrid matrix, the linking group being an organic chain and resulting from the reaction of a first functional group with a second functional group, Functional groups include a double bond, such as vinyl, —CH=$CH_2$, acrylate, methacrylate, and styrene. In these examples, a first precursor includes a hydrolyzable silicon-containing group and a first functional group. A second precursor includes an acid group and a second functional group. The hydrolyzable silicon-containing group is hydrolyzed and the silicon atom therein becomes part of a hybrid organic-inorganic matrix.

Also, the first and second functional groups (for example, double bonds) react so as to link the acid group to the inorganic-organic hybrid matrix by polymerization. Other examples of linking groups are discussed herein.

Copolymerization

A copolymer can be formed by copolymerization of a plurality of precursors. For example, the precursors can include a plurality of silicon compounds. A first silicon compound can include one or more hydrolyzable silicon-containing groups, such as an alkoxysilyl (or other silyl group) so that the alkoxysilyl group is at least partially hydrolyzed during polymerization. A second silicon compound may be provided, also one or more hydrolyzable silicon-containing groups and an organic chain, so that the organic chain is incorporated in a hybrid organic-inorganic matrix after hydrolyzation occurs.

One or more precursors includes an acid group. The acid-group containing precursor may comprise an acid group linked to a hydrolyzable silicon-containing group through a linking group. Alternatively, the acid-group containing precursor may comprise an acid group linked to a functional group, the functional group reacting with a functional group of another precursor, the other precursor containing a hydrolyzable silicon-containing group. In either approach, the acid group becomes attached to a hybrid inorganic-organic matrix.

Hence, a method of fabricating a copolymer for use in a polymer electrolyte membrane, comprises providing a first silicon compound including an organic chain having at least two carbon atoms, the first silicon compound further including a silyl group and a functional group, the silyl group and functional group being connected by the organic chain. Further, a second silicon compound is provided, including at least one acid group, the acid group being linked by a linking group to a silyl group of the second silicon compound. The first silicon compound and the second silicon compound are then copolymerized, the copolymerization process including at least partial hydrolysis of the silyl group of the first silicon compound, and at least partial hydrolysis of the silyl group of the second silicon compound. A copolymer is produced, providing an inorganic-organic hybrid matrix including silicon atoms provided by the silyl group of the first silicon compound, silicon atoms provided by the silyl group of the second silicon compound, and organic chains provided by the first silicon compound. Acid groups are linked to the silicon atoms provided by the silyl group of the second silicon compound by the linking groups.

Hence, an example copolymer comprises at least a first monomer unit and a second monomer unit in a random sequence, wherein the first monomer unit includes an organic chain having 2–20 carbon atoms, and at least one silicon atom; and the second monomer unit includes an acid group connected by a linking group to another silicon atom.

Other Precursors

Other precursors which may be used include phenyltrialkoxysilanes, other compounds containing hydrolyzable silicon-containing groups (such as TEOS), and other compounds containing functional groups.

Applications

Polymers (copolymers) described herein can be used in improved polymer electrolyte membranes (PEMs), or in other applications. Applications of polymers described herein include fuel cells, hydrogen separation, hydrogen purification, reforming or partial oxidation of hydrocarbon fuels, contaminant removal, gas sensing, and other processes relevant to energy storage and conversion.

Hence, a fuel cell according to the present invention includes a positive electrode, a negative electrode, and a proton-conducting membrane formed from a polymer described herein. The dimensions of the membrane can be determined by the configuration of the fuel cell, as is well known in the art. Proton conducting materials can be produced in a form suitable for use as a membrane without further processing, or formed as a tape or sheet that can be cut to a desired shape, or further processed.

Other applications include ion-exchange membranes, extraction of a predetermined fluid component (such as an ion) from a fluid, acid catalyst in a chemical processing system, other ion conducting applications, or selective ion-transmitting membranes.

Hence, an improved PEM is provided by forming a copolymer such as described herein into a membrane having desired dimensions. An improved fuel cell is provided by further including an improved PEM into a fuel cell configuration, such as a fuel cell configuration known in the art.

The following chemical abbreviations are used in examples below, and are listed here for convenience:

BTESO—bis(triethoxysilyl)octane
BTESEB—bis(triethoxysilylethyl)benzene
DMSFP—[4-(diethoxymethylsilyl)-1,1-difluoro-butyl]-phosphonic acid diethyl ester
DSFP—diethyl-4-(triethoxysilyl)-1,1-difluorobutylphosphonate
GPTS—(3-glycidoxypropyl)triethoxysilane
MAPOS—methacryloxypropylmethyldiethoxysilane
MDSPPO—bis(3-methyldimethoxysilyl)propylpolypropylene oxide
HDMSFP—[4-(dihydroxymethylsilyl)-1,1-difluoro-butyl]-phosphonic acid diethyl ester
OTMOS—7-octenyltrimethoxysilane
PBI—polybenzimidazole
PETHS—dihydroxyphosphorylethyltrihydroxysilane
PPTHS—p-dihydroxyphosphorylphenyltrihydroxysilane
TEOS—tetraethoxysilane
TPES—tris(dimethoxyphosphorylethyl)ethoxysilane
TPHS—tris(dihydroxyphosphorylethyl)hydroxysilane
VPA—p-vinylbenzylphosphonic acid
VPMS—(3-(4-vinylbenzylthio)propyl)diethoxy(methyl)silane Alkoxyphosphoryl Grafted Alkoxysilanes

Alkoxyphosphoryl groups were grafted on alkoxysilanes. The molecular structures of example alkoxysilanes are shown in Schemes 1 and 2. Dihydroxyphosphoryl grafted hydroxysilanes, synthesized by hydrolysis of corresponding alkoxyphosphoryl grafted alkoxysilanes, were dissolved in a solvent (such as methanol, ethanol, or THF) together with other alkoxysilanes, such as tetraethoxysilane (TEOS) and other precursors such as organic chain formers, and hydrolyzed by water using hydrochloric acid as a catalyst.

After the sols were stirred for a period from 1 to 48 hours according to the composition of the sols, the sols were cast in Petri dishes. For a thermal curing process, the sols were heated in a dry oven at an elevated temperature for curing. The solvent evaporation rate was carefully controlled, as the mechanical properties of the membranes depend strongly on the evaporation rate. For a UV curing process, the solvents were evaporated in reduced pressure, and then the obtained resin was UV cured.

In another process of membrane manufacture, the mixture of phosphonic-acid grafted precursors containing double bond, alkoxysilyl grafted precursors containing double bond, and/or alkoxysilyl-ended organic polymers, and initiators (0.5% to 5%) was cast into molds, and then the mixture was polymerized through photo/thermo initiated radical polymerization.

Dialkoxyphosphoryl Grafted Alkoxysilanes (1)

Scheme 1 above shows a general structure of dialkoxyphosphoryl grafted alkoxysilanes. In representative examples, R is a linking group, for example, an aliphatic hydrocarbon group having 2 to 18 (or 2 to 20) carbons, a phenyl group or derivative, or a methacryl (or acryl) containing aliphatic group, or other linking group such as described herein. A represents an alkoxy group, such as $C_2H_5O$— or $CH_3O$—, and X can be 1, 2, or 3. M may be methyl-, ethyl-, propyl-, or other alkyl or organic group. Other representative examples include compounds with alkyl and alkoxy groups attached to the silicon atom. In other examples, the silicon atom is substituted with one or more other organic groups.

Example dialkoxyphosphoryl grafted alkoxysilanes (see Scheme 1), which can be used in examples of this invention, include diethoxyphosphorylethyltriethoxysilane, p-diethoxyphosphorylphenyl-triethoxysilane, dimethoxyphosphorylphenylmethyldimethoxysilane, p-diethoxyphosphorylpropyl-triethoxysilane, diethoxyphosphoryloctylmethyldiethoxysilane, diethoxyphosphonotriethoxysilane ketone, dimethoxyphosphorylbutyltrimethoxysilane, tris(dimethoxyphosphorylethyl)ethoxysilane, bis(dimethoxyphosphorylethyl)-diethoxysilane, and the like.

Fluorinated Phosphoryl Containing Precursors for Hybrid Inorganic-Organic Copolymers Fluorinated phosphonic acid groups such as —$(CF_2)_n$—$PO_3H_2$ or —$(CHF)_n$—$PO_3H_2$ have stronger acidity than —$CH_2$—$PO_3H_2$ groups because of the large electron-withdrawing effect of the C—F group directly connected to the —$PO_3H_2$ group. Thus, the membranes having grafted fluorinated phosphonic acid groups have high proton conductivity.

The precursors for hybrid inorganic-organic copolymers can be written as shown in Scheme 2:

(2)

Scheme 2 above shows a general structure of example fluorinated phosphoryl containing precursors. In representative examples, $R_1$ can be a —$(CHF)_n$— or —$(CF_2)_n$— group with n=1~20; $R_2$ can be a carbon-hydrogen chain (or other chain) with $C_1$ to $C_{20}$; $R_3$ is —$CH_3$, —$C_2H_5$ or —$C_3H_7$; A can be —$OCH_3$, or —$OC_2H_5$; M is alkyl, and x=1 or 2.

In other examples, A can be any alkoxy group or other hydrolyzable group, and M can be an organic group, such as an alkyl group. In these examples, the linking group comprises —$R_1$—$R_2$—. In other examples, $R_1$ can be a halogen-substituted hydrocarbon such as —$CF_2CHF$—, —$CCl_2$—, and the like, and $R_1$ can include one or more other electron withdrawing groups.

Phosphonic-Acid Grafted Precursors with Double Bond (3)

Scheme 3 above shows a general structure for representative examples of phosphonic-acid grafted precursors having a functional group B. Examples include precursors where $R_1$ can be a —$(CHF)_n$—, or —$(CF_2)_n$— group with n=1~20; other (at least partially) halogenated (e.g. fluorinated) alkane, alkene, or hydrocarbon; other substituted group (for example, containing another electron withdrawing group or groups); or a hydrocarbon chain with $C_1$ to $C_{20}$. B can be a functional group (such as —$CH=CH_2$) for polymerization, for example attachment of the acid group to a hybrid inorganic-organic matrix through copolymerization with a silicon-containing compound having a second functional group that reacts with B.

Specific examples of such precursors include: p-vinylbenzylphosphonic acid; 3-trifluoroethenoxyhexafluoropropylphosphonic acid; vinylphosphonic acid, and the like.

Organic Chain Formers $$(A_{3-x}M_x)Si—R—B \quad (4)$$

Scheme 4 above shows alkoxysilanes with functional groups as organic chain formers. R is represents an organic chain, such as an aliphatic chain, such as an alkyl chain having 1 to 20 carbons atoms, A represents an alkoxy group such as $C_2H_5O$— or $CH_3O$—; M represents an alkyl group such as $C_2H_5$— or $CH_3$—; X is 1 or 2. B is a functional group, such as —OH, —SH, —$CH=CH_2$, —$NH_2$, epoxy ring, a second silicon containing group such as a second silyl group, or other functional group.

Example precursors which can be used as organic chain formers in examples of this invention are illustrated generally in Scheme 4. They can form organic polymer chains or networks thermally or chemically in the membrane fabrication process. Specific examples of such alkoxysilanes include (3-glycidoxypropyl)methyldiethoxysilane, (3-glycidoxypropyl)methyldimethoxysilane, (3-glycidoxypropyl)triethoxysilane, (3-glycidoxypropyl)trimethoxysilane, 3-mercaptopropyltrimethoxysilane, 3-mercaptopropylmethyldimethoxysilane, 3-aminopropyltriethoxysilane, 3-aminopropyltrimethoxysilane, 3-aminopropylmethyldiethoxysilane, 3-aminopropylmethyldimethoxysilane, n-(2-aminoethyl)-11-aminoundecyltrimethoxysilane, n-(6-aminohexyl)aminopropyltrimethoxysilane, (3-acryloxypropyl)dimethylmethoxysilane, (3-acryloxypropyl)methyldimethoxysilane, (3-acryloxypropyl)trimethoxysilane, 3-(N-allylamino)propyltrimethoxysilane, allyltriethoxysilane, allyltrimethoxysilane, butenyltriethoxysilane, docosenyltriethoxysilane, (methacryloxymethyl)dimethylethoxysilane, methacryloxymethyltriethoxysilane, methacryloxymethyltrimethoxysilane, methacryloxypropyldimethylethoxysilane, methacryloxypropylmethyldimethoxysilane, methacryloxypropylmethyldiethoxysilane, methacryloxypropyltriethoxysilane, 7-octenyltrimethoxysilane, styrylethyltrimethoxysilane, vinyltrimethoxysilane, vinyltriethoxysilane, and the like.

Bisalkoxysilyl Terminated Chains

Bisalkoxysilyl terminated polymers or bisalkoxysilyl terminated short organic chains can also be used as organic chain formers in examples of this invention (for example as shown in Scheme 5 below).

Specific examples include: bis(3-methyldimethoxysilyl)(propyl)polypropylene oxide, bis(triethoxysilyl)ethane, bis(triethoxysilyl)octane, bis(triethoxysilylethyl)benzene, and the like.

$$(A_{3-x}M_x)Si-R-Si(A_{3-x}M_x) \quad (5)$$

Scheme 5 above shows an example general formula for bisalkoxysilyl terminated polymers or bisalkoxysilyl ended short organic chains. In representative examples, R can be an organic chain. A can be $C_2H_5O-$, $CH_3O-$, other alkoxy, other hydrolyzable group, or other organic group; M can be $C_2H_5-$, $CH_3-$, other alkyl, or other hydrocarbon or organic group, and x can be 1 or 2.

Synthesis of Precursors

Examples 1 to 3 illustrate the synthesis of new precursors that can be used to prepare membranes.

EXAMPLE 1

Synthesis of precursor (3-(4-vinylbenzylthio)propyl)diethoxy(methyl)silane: the precursor of (3-(4-vinylbenzylthio)propyl)diethoxy(methyl)silane was synthesized in the process as shown below in Scheme 6. 10 mmole of potassium ethanolate (3.507 g of 24% ethanol solution) was added to the solution of 10 mmole 3-(diethoxy(methyl)silyl) propane-1-thio in 20 ml of ethanol.

The mixture was stirred for 5 minutes, and then 10 mmole of p-vinylbenzyl chloride was added dropwise, and stirred for 12 hours. The white precipitate KI was removed by filtration. About 2.6 g of colorless viscous liquid was separated from the filtrate through a silicate gel column chromatography eluted with ethyl acetate and hexane (⅓ in volume) (yield 80.2%). $^1$H NMR data: 7.33 (4H, m), 6.70 (1H, m), 5.72 (1H, d, $J_{H-H}$=17.58), 3.77 (6H, m), 2.43 (2H, t, $J_{H-H}$=7.30, 1.63 (2H, m), 1.23 (6H, m), 0.67 (2H, m), 0.09 (3H, s).

Scheme 6:
Synthesis of (3-(4-vinylbenzylthio)propyl)diethoxy(methyl)silane.

(6)

EXAMPLE 2

Synthesis of [4-(diethoxymethylsilyl)-1,1-difluoro-butyl]-phosphonic acid diethyl ester (DMSFP). 5 g (23.4 mmol) diethyl-1,1-difluorobut-3-enylphosphonate was mixed with 7.5 g (56 mmol) diethoxymethylsilane and several drops of hydrogen hexachloroplatinate (IV) solution (5% in isopropanol). After stirring at 60° C. overnight, the solution was evaporated under reduced pressure to remove the reactants and product [4-(diethoxymethylsilyl)-1,1-difluoro-butyl]-phosphonic acid diethyl ester (DMSFP, 6 g, 16.6 mmol, yield 71%) was provided. See Scheme 7. $^1$H NMR (CDCl$_3$): δ(ppm) 0.12(3H, s), 0.65 (2H, m), 1.21 (6H, t, $J_{H-H}$=6.98), 1.35 (6H, 6, $J_{H-H}$=7.06), 1.65 (2H,m), 2.15 (2H,m), 3.75 (4H, q, $J_{H-H}$=6.98), 4.26 (4H, q, $J_{H-H}$=7.06).

Scheme 7:
Synthesis of [4-(diethoxymethylsilyl)-1,1-difluoro-butyl]-phosphonic acid diethyl ester (7)

EXAMPLE 3

Synthesis of [4-(triethoxysilyl)-1,1-difluoro-butyl]-phosphonic acid diethyl ester (DSFP): 5 g (23.4 mmol) diethyl-1,1-difluorobut-3-enylphosphonate was mixed with 56 mmol triethoxymethylsilane and several drops of hydrogen hexachloroplatinate(IV) solution (5% in isopropanol). After stirring at 60° C. overnight, the solution was evaporated under reduced pressure to remove the reactants and the product [4-(triethoxysilyl)-1,1-difluoro-butyl]-phosphonic acid diethyl ester (DSFP, yield 50%) was provided. $^1$H NMR (CDCl$_3$): δ(ppm) 0.67 (2H, m), 1.21 (9H, t, $J_{H-H}$=6.98), 1.35 (6H, 6, $J_{H-H}$=7.06), 1.70 (2H, m), 2.08 (2H, m), 3.85 (6H, q, $J_{H-H}$=6.98), 4.26 (4H, q, $J_{H-H}$=7.06).

Scheme 8:
Synthesis of [4-triethoxysilyl)-1,1-difluoro-butyl]-phosphonic acid diethyl ester.

(8)

EXAMPLE 4

A method to convert diethoxyphosphoryl- to dihydroxyphosphoryl- in the precursors containing alkoxysilyl- groups is described. As shown below in Scheme 9, the method with diethoxyphosphoryl-ethyltriethoxysilane as an example can be described as follows: 3.28 g diethoxyphosphorylethyltriethoxysilane was dissolved in 50 ml of condensed hydrochloric acid aqueous solution by stirring in a three-neck flask with a condenser and an argon gas line. The flask was put into an oil bath and kept at 90° C. for about 24 hours under the protection of argon. After cooling down to 50° C., the hydrochloric acid aqueous solution was evaporated in reduced pressure, and a transparent viscous solid was obtained. FTIR spectra of the obtained solid show that the characteristic peak of —POH groups appeared at 2320 cm$^{-1}$. The solid was re-dissolved in ethanol for use in membrane fabrication.

(9)

Scheme 9 above shows hydrolysis of diethoxyphosphorylethyltriethoxysilane to dihydroxyphosphorylethyltrihydroxysilane (PETHS)

Manufacture of Membranes

The following examples illustrate membrane preparation methods.

EXAMPLE 5

Proton conducting membranes were fabricated using bis(3-methyldimethoxysilyl)propylpolypropylene oxide (MDSPPO) and bis(triethoxysilyl)octane (BTESO) as polymer network former. These precursors together with PETHS were dissolved in ethanol. After stirring for 20 minutes, 0.5 N HCl aqueous solution (or pure water) was added drop-wise to the precursor solution, and stirred for 12 hours to form sols.

The composition of the membranes can be labeled as (x M-y Oc-z P), representing (x MDSPPO-y BTESO-z PETHS), where x, y, and z represent the moles of Si from MDSPPO, BTESO, and PETHS, respectively. In these examples, x is 1–2, y is 2–4, and z is 3–6. The amount of water added was 4 times of the total Si in moles.

To make self-standing membranes, the sol was cast into Petri dishes. A small hole was opened on the cover to evaporate the organic solution and water slowly in about 6 days. Then the covers were removed and the membranes were dried at 60° C. for 3 days, at 80° C. for 12 hours, and at 100° C. for 3 hour.

TGA-DSC curves show that the membranes are thermally stable up to 220° C. (see FIG. 1), and the proton conductivity can reach $6.8 \times 10^{-2}$ S/cm in an environment with near 100 percent relative humidity at 100° C. (see FIG. 5), and $2.2 \times 10^{-3}$ S/cm in RH of about 20 percent at 100° C. (see FIG. 6).

The various figures use the composition key: M=MDSPPO (this example), Be=BTESEB, Oc=BTESO (this example), G=GPTS, P=PETHS, FP=HDMSFP.

EXAMPLE 6 (MDSPPO/BTESEB/PETHS)

Proton conducting membranes were fabricated with bis(3-methyldimethoxysilyl)propylpolypropylene oxide (MDSPPO) and bis(triethoxysilylethyl)benzene (BTESEB) as organic chain network formers. The above precursors together with PETHS were dissolved in ethanol. After stirring for 20 minutes, 0.5 N HCl aqueous solution was added drop-wise to the precursor solution, and stirred for 12 hours to form sols.

The composition of the membranes can be labeled as x MDSPPO-y BTESEB-z PETHS, where x, y, and z represent the moles of Si from MDSPPO, BTESEB, and PETHS, respectively. In representative examples, x is 1–2, y is 2–4, and z is 3–8. The amount of water added is 4 times of the total Si in moles.

To make self-standing membranes, the sol was cast into Petri dishes. A small hole was opened on the cover to evaporate the organic solution and water slowly in about 6 days. Then the covers were removed and the membranes were dried at 60° C. for 3 days, at 80° C. for 12 hours, and at 100° C. for 3 hour. The membranes are flexible with a thickness of 0.1 mm or thinner.

Membranes can also be made to other dimensions as required by a desired application, for example 1 mm or thinner, 0.2 mm or thinner, non-uniform thickness, or other shape. Membranes can be stacked in a multilayer configuration to obtain thicker dimensions if desired.

Figure 1:
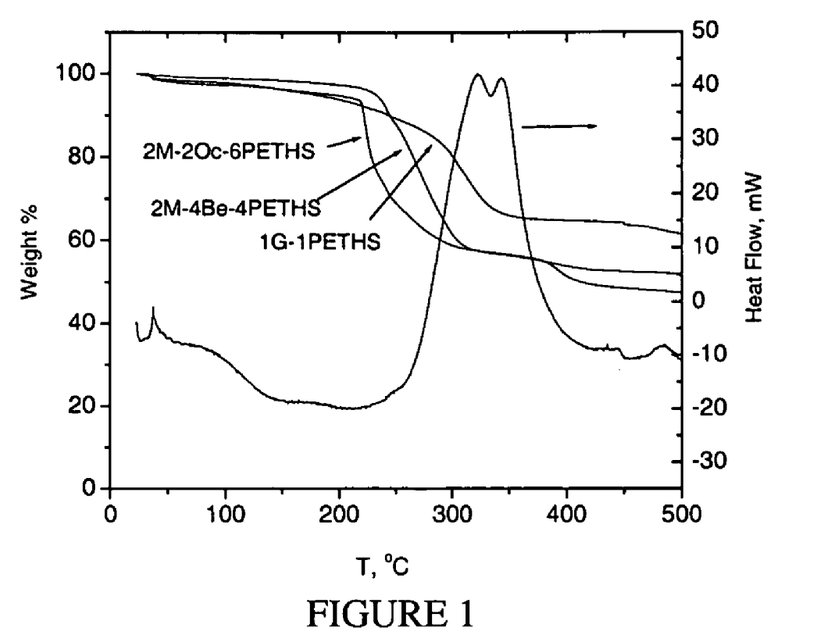
FIG. 1 shows TGA (thermogravimetric analysis) curves of membranes fabricated using improved polymers, measured in dry air with a heating rate of 5° C./min, where the composition key uses M=MDSPPO, Be=BTESEB, Oc=BTESO, and G=GPTS, and the DSC (differential scanning calorimetry) curve of 1 GPTS-1 PETHS.
Figure 6:
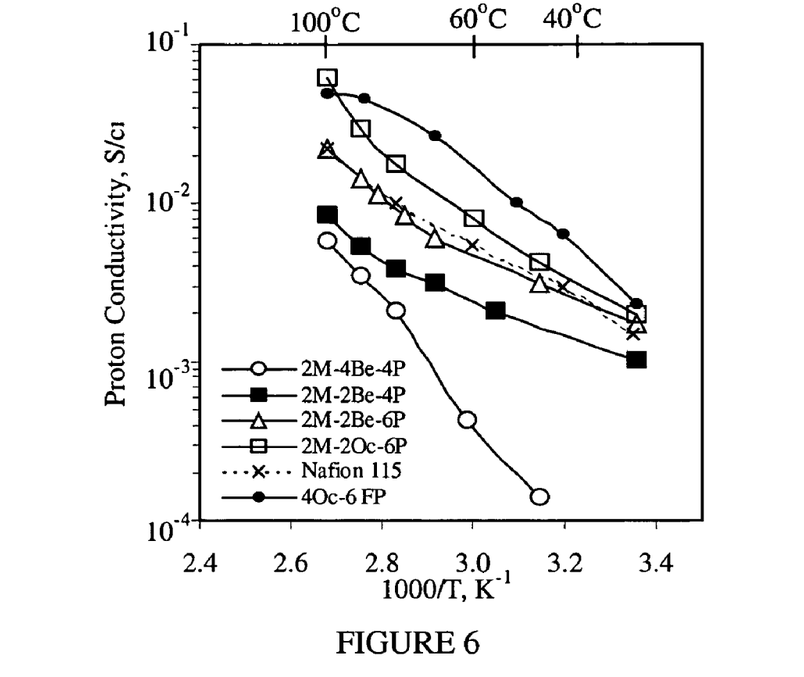
FIG. 6 shows proton conductivity of membranes with compositions of x MDSPPO-y BTESEB-z PETHS (x M-y Be-z P, where x=2, y=2 and 4, z=4), 2 MDSPPO-2 BTESO-6 PETHS (2 M-2 Oc-6 P), and 4 BTESO-6 HDMSFP (4Oc-6FP), at a relative humidity of 100 percent.

FIG. 1 illustrate TGA-DSC curves that show that the membranes are thermally stable up to 220° C. FIG. 6 shows that the proton conductivity in an environment with near 100% relative humidity can reach 0.02 S/cm at 100° C.

EXAMPLE 7

Proton conducting membranes were fabricated with bis(3-methyldimethoxysilyl)propyl-polypropylene oxide (MDSPPO) and bis(triethoxysilyl)octane (BTESO) as polymer network former. These precursors together with HDMSFP ([4-(dihydroxymethylsilyl)-1,1-difluoro-butyl]-phosphonic acid diethyl ester) were dissolved in ethanol. After stirring for 20 minutes, 0.5 N HCl aqueous solution (or pure water) was added drop-wise to the precursor solution, and stirred for 48 hours to form sols.

The composition of the membranes can be labeled as x MDSPPO-y BTESO-z HDMSFP, where x, y, and z represent the moles of Si from MDSPPO, BTESO, and HDMSFP, respectively. In representative examples, x is 0–2, y is 2–4, and z is 3–6. The amount of water added was 4 times of the total Si in moles.

To make self-standing membranes, the sol was cast into Petri dishes. A small hole was opened on the cover to evaporate the organic solution and water slowly in about 6 days. Then the covers were removed and the membranes were dried at 60° C. for 3 days, at 80° C. for 12 hours, and at 100° C. for 3 hour. The proton conductivity can reach $5.4 \times 10^{-2}$ S/cm in an environment with near 100% relative humidity at 100° C. (see FIG. 6).

EXAMPLE 8

Proton conducting membranes were fabricated with (3-glycidoxypropyl)triethoxysilane (GPTS) as a polymer network former.

The precursor solution was prepared by dissolving GPST, tetraethoxysilane (TEOS), and dihydroxyphosphorylethyltrihydroxysilane (PETHS) in ethanol. After stirring for 20 minutes, 0.5 N HCl aqueous solution (or pure water) was added drop-wise to the precursor solution, and stirred for 12 hours to form sols. The composition of the membranes can be labeled as x GPTS-y TEOS-z PETHS, where x is 20 to 50% in mole, y 0–50% in mole, and z 30–50% in moles. The amount of water added is 4 times of the total Si in moles. To make self-standing membranes, the sol was cast into Petri dishes. After the Petri dish was covered and kept in a dry oven at 60° C. for 3 days, a small hole was opened on the cover to evaporate the organic solution and water slowly in about 6 days. Then the covers were removed and the membranes were dried at 60° C. for 3 days, at 80° C. for 12 hours, and at 100° C. for 3 hour. TGA-DSC curves (FIG. 1) show that the membranes are thermally stable up to 300° C., and the proton conductivity in an environment with near 100% relative humidity can reach $4 \times 10^{-3}$ S/cm at 50° C.

EXAMPLE 9 p-Diethoxyphosphorylphenyltriethoxysilane was hydrolyzed in a similar process as described in Example 4 to get p-dihydroxyphosphorylphenyltrihydroxysilane (PPTHS). PPTHS together with 7-octenyltrimethoxysilane (OTMOS) and TEOS were dissolved in ethanol. After stirring for 20 minutes, 0.5 N HCl aqueous solution (or pure water) was added drop-wise to the precursor solution, and stirred for 12 hours to form sols. Finally, benzoyl peroxide (0.2–1.0% of OTMOS in weight) as catalyst was added to the sol and further stirred for 30 minutes. The composition of the membranes can be labeled as x OTMOS-y TEOS-z PPTHS, where x, y, and z represent the moles of Si from OTMOS, TEOS, and PPTHS, respectively.

In representative examples, x is 1–2, y is 2–4, and z is 3–6. The amount of water added is 4 times of the total Si in moles. To make self-standing membranes, the solvents of the sols were evaporated in reduced pressure. The residual resins were cast into molds, and heated at 60° C. in about 3 days, at 80° C. for 12 hours, and at 100° C. for 3 hour. The proton conductivity in an environment with near 100% relative humidity can reach $10^{-2}$ S/cm at 100° C.

EXAMPLE 10

Proton conducting membranes were fabricated using a hydroxysilyl grafted precursor containing a first functional group (a first double bond), a phosphonic-acid grafted precursor containing a second functional group (a second double bond), together with hydroxysilyl-ended plastic polymers (organic chains having hydrolyzable silicon-containing groups on each end of the chain).

The precursor solution was prepared by dissolving (3-(4-vinylbenzylthio)propyl)diethoxy(methyl)silane (VPMS, see Example 1), p-vinylbenzylphosphonic acid (VPA), and MDSPPO in a small amount of ethanol with stirring. Water ($H_2O/Si=4/1$ in mole) was added drop-wise to the precursor solution, and stirred for 30 minutes, and then benzyl peroxide (BPO) was added as an initiator (0.5% of the total weight of VPMS, VPA, and MDSPPO).

The composition of the membranes can be labeled as x MDSPPO-y VPMS-z VPA, where x is 0 to 20% in mole, y is 0–50% in mole, and z is 30–60% in mole.

To make self-standing membranes, the liquid mixture was cast into Petri dishes. After the Petri dish was covered, it was kept in a dry oven at 80° C. for 3 days and at 100° C. for 3 hours. The proton conductivity in an environment with near 100% relative humidity can reach $10^{-2}$ S/cm at 100° C.

EXAMPLE 11

Hybrid inorganic-organic proton conducting membranes were fabricated containing tris(phosphorylethyl)hydroxysilane (TPHS). In a first step, tris(dimethoxyphosphorylethyl)ethoxysilane (TPES, see Scheme 10) was synthesized from trivinylethoxysilane and dimethyl phosphite as described in U.S. Pat. No. 3,122,581. 3.30 g of dimethyl phosphite (30 mmole) was placed in a three-neck flask with a condenser and an Ar gas line. The flask was put into oil bath and heated to 145° C. A mixture of 0.08 g benzoyl peroxide in 1.543 g trivinylethoxysilane (10 mmole) was added drop-wise. Heating was continued for 2 hours, and then cooled down to room temperature.

Scheme 10:
Tris(dimethoxyphosphorylethyl)ethoxysilane (TPES)

(10)

In a second step, the obtained TPES was hydrolyzed using a similar method to that described in Example 1 above. The obtained TPHS was a viscous colorless liquid, and was soluble in water.

Finally, the hybrid inorganic-organic membrane containing TPHS with bis(3-methyldimethoxysilyl)(propyl)polypropylene oxide (MDSPPO) and bis(triethoxysilyl)octane (BTESO) as polymer network former was fabricated with a solvent-free method. MDSPPO and BTESO were mixed together carefully. A certain amount of water (about three times the number of moles of the total Si in MDSPPO and BTESO) was added into TPHS, and then added drop-wise into the mixture of MDSPPO and BTESO, quickly with stirring. The obtained viscous colorless liquid was cast on Petri dishes, put into a dry oven at 60° C. for several days to evaporate water and small organic molecules from the membranes, and then dried at 100° C. for 6 hours.

Figure 4:
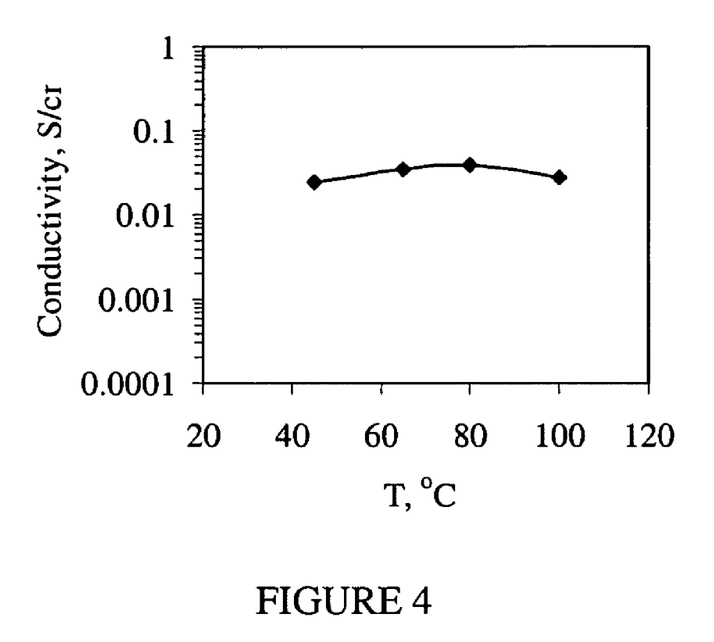
FIG. 4 shows proton conductivity of membranes with a compositions of 1 MDSPPO-1 BTESO-1TPHS in RH=70 percent.

The composition of the membranes can be labeled as x MDSPPO-y BTESO-z TPHS, where x, y, and z represent the moles of Si from MDSPPO, BTESO, and TPHS, respectively. In representative examples, x is 1–2, y is 2–4, and z is 3–6. The obtained membranes have high flexibility and good mechanical strength. $^{31}$P NMR spectra confirmed that less than 3% of total P exists as free $H_3PO_4$ molecules in the membranes. TGA-DSC curves show that the membranes are thermally stable up to 250° C. The proton conductivity of the membrane with a composition of 1 MDSPPO-1 BTESO-1 TPHS at 100° C. was $2.6 \times 10^{-2}$ S/cm in RH 70% (see FIG. 4).

Thermal Stability of the Membranes

FIG. 1 shows the TGA curves of the samples with compositions of 2 MDSPPO-2 BTESO-6 PETHS (Example 5), 2 MDSPPO-4 BTESEB-4 PETHS (Example 6), and 1 GPTS-1 PETHS (Example 8) together with the DSC curve of 1 GPTS-1 PETHS in dry air from room temperature to 500° C. There are mainly two mass-loss steps in the TGA curve. The small weight loss below the decomposition temperatures corresponds to the evaporation of the water and the small organic molecules in the membrane. The decomposition of the organic part of the copolymers starts from 220° C., 240° C., and 280° C. for the membranes 2 MDSPPO-2 BTESO-6 PETHS, 2 MDSPPO-4 BTESEB-4 PETHS, and 1 GPTS-1 PETHS, respectively. Correspondingly there appear exothermic peaks near the decomposition temperature in the DSC curves. The hybrid inorganic-organic membranes are therefore stable up to 220° C. in dry air.

Figure 3:
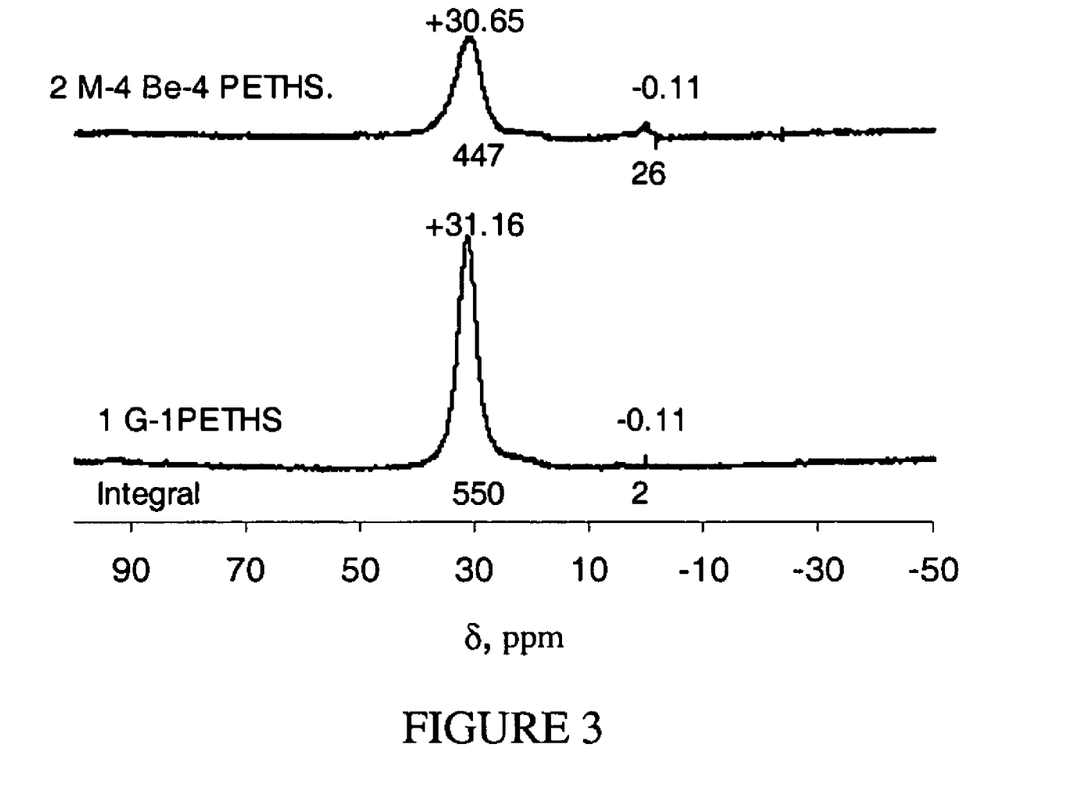
FIG. 3 shows $^{31}P$ NMR spectra of the membranes with a composition of 1 G-1 PETHS and 2 MDSPPO-2 BTESEB-4PETHS.

Status of —$PO_3H_2$ Groups in Membranes $^{31}P$ NMR spectra of the membranes 1 GPTS-1 PETHS and 2 MDSPPO-2 BTESEB-3 PETHS were acquired to further check the status of the phosphonic acid groups in the membranes (see FIG. 3).

Two $^{31}P$ resonance peaks were observed at δ=−0.1 ppm and +31 ppm, respectively. The extremely strong peak at δ=31 ppm is attributed to the —$PO_3H_2$ groups grafted on aliphatic chains via C—P bonds. The weak peak is at δ=−0.11 ppm. the observed integral of the weak peak is about 0.3% and 4.3% of the total $^{31}P$ resonance peaks for the samples with composition of 1 GPTS-1 PETHS and 2 MDSPPO-2 BTESEB-3 PETHS. It is noted that more than 95% of phosphonic groups —$PO_3H_2$ in the membranes did not react with the SiO networks in the new hybrid inorganic-organic membranes, and so remain as —$PO_3H_2$ groups. These groups can act as proton donors and acceptors, and can contribute to proton conduction.

Proton Conductivity in the Anhydrous State

Figure 2:
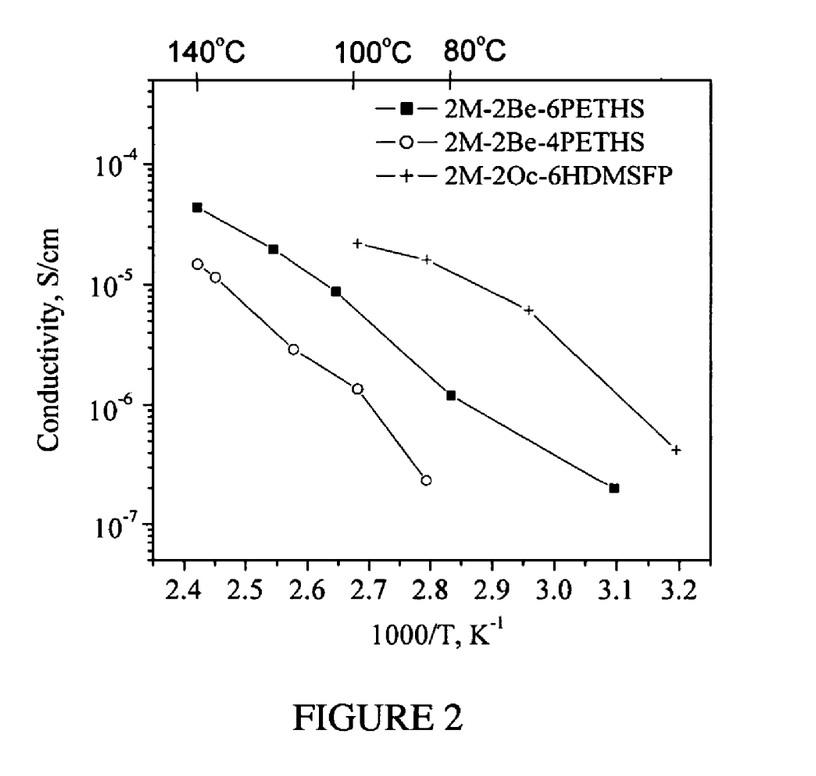
FIG. 2 shows proton conductivity of phosphonic acid group (—$PO_3H_2$) grafted membranes in the anhydrous state.

FIG. 2 shows the proton conductivity of three samples in the anhydrous state. HDMSFP is hydrolyzed DMSFP. The proton conductivity of the sample with a composition of 2MDSPPO (M)-2 BTESO (Oc)-6 PETHS is $4.3 \times 10^{-5}$ S/cm at 140° C.

Humidity Dependence of Proton Conductivity

Figure 5:
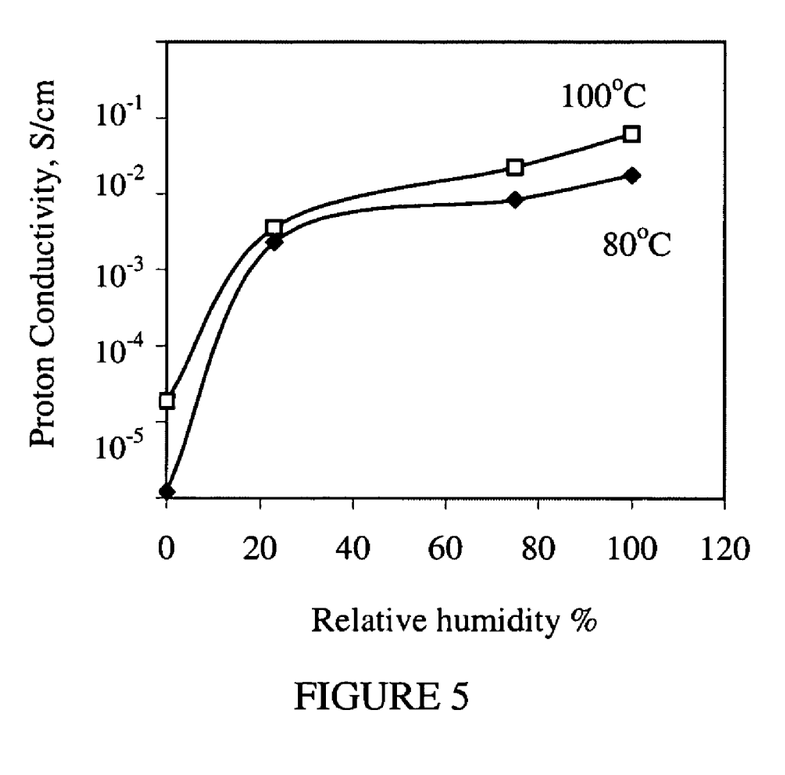
FIG. 5 shows humidity dependence of the proton conductivity of a sample having composition 2 MDSPPO-2 BTESO-6 PETHS at 80° C. and 100° C.

FIG. 5 shows the humidity dependence of the proton conductivity of the membrane with a composition of 2 MDSPPO-2 BTESO-6 PETHS at 80° C. and 100° C. The proton conductivity is on the order of $10^{-6} \sim 10^{-5}$ S/cm in the anhydrous state in the temperature range from 80° C. to 100° C., but increases dramatically with increasing relatively humidity. The proton conductivity can reach $2.3 \times 10^{-3}$ S/cm in RH~20%, and $1.76 \times 10^{-2}$ S/cm in RH~100% at 80° C. The dramatic increase of the proton conductivity of these membranes in a wet atmosphere can be attributed to the fast transport of $H_3O^+$ as a vehicle of protons.

The water uptake rate in relative humidity 100% was calculated by the weight change between the dried (in dry Ar at 70° C. for about 12 hours) and water-saturated (in closed water chamber for 24 hours at room temperature) samples. It was found to increase with increasing —$PO_3H_2$ groups content of the samples. It was 10.8 wt %, 15.0 wt %, and 26.5 wt % for the samples 2 MDSPPO-4 BTESEB-4 PETHS, 2MDSPPO-2 BTESEB-4 PETHS, and 2 MDSPPO-2 BTESEB-6 PETHS, respectively, implying that one mole of —$PO_3H_2$ groups in these membranes absorbs 2.6 mole, 3.1 mole, and 4.4 mole of water, respectively.

The membranes with compositions of 2 MDSPPO-2 BTESO-6 PETHS (grafted —$CH_2$—$PO_3H_2$) and 2 MDSPPO-2 BTESO-6 HSMSFP (grafted —$CF_2$—$PO_3H_2$) have a similar water uptake in which one mole of —$PO_3H_2$ absorbed 5.1 and 5.4 moles of water, respectively. Compared with polymer poly(vinyl acrylate phosphoric acid) grafted phosphorus groups, in which one mole of acid groups can usually absorb at least 12 moles of water, the new hybrid inorganic-organic membranes with —$PO_3H_2$ groups absorbed much smaller amount of water.

It has been reported that the water uptake of polymer materials grafted acid groups is controlled by the molecular structures of the materials. For example, in S-PPBP (sulfonated poly(4-phenoxybenzoyl-1,4-phenylene)) and S-PEEK (sulfonated poly(oxy-1,4-phenyleneoxy-1,4-phenylenecarbonyl-1,4-phenylene)), one mole of —$SO_3H$ can absorb 9 and 3 moles of water, respectively, in relative humidity 100% at RT owing to the flexible side chains of S-PPBP. The lower water uptake of the new hybrid inorganic-organic copolymer membranes may be attributed to the tight inorganic —Si—O—Si—O— networks.

Proton Conductivity of Membranes in 100% Relative Humidity

The proton conductivity of all the obtained membranes was measured in RH~100% from room temperature to 100° C.

FIG. 6 shows the temperature dependence of the proton conductivity of the MDSPPO-based membranes and Nafion® 115 for comparison. The proton conductivity increased with —$PO_3H_2$ content. It can reach $10^{-2}$ S/cm at 100° C. when the —$PO_3H_2$/Si ratio in moles is larger than ½ in the membranes. The proton conductivity of the new hybrid inorganic-organic membranes is comparable with that of Nafion® and sulfonated aromatic polymer membranes.

The proton conductivity of 4 BTESO-6 HDMSFP is higher than that of 2 MDSPPO-2 BTESO-6 PETHS and 2 MDSPPO-2 BTESEB-6 PETHS (all samples have a P/Si ratio of 6/10) because of the stronger acidity of —$CF_2$—$PO_3H_2$ group than —$CH_2$—$PO_3H_2$ group. It is notable that the membrane with BTESO has higher proton conductivity than those with BTESEB when they have the same content of —$PO_3H_2$ groups. In the membrane with BTESO, one mole of —$PO_3H_2$ groups can absorb a little more $H_2O$ than in the membrane with BTESEB. Meanwhile, the higher proton conductivity of the membrane with BTESO may be related to the fact that the aliphatic chains introduced by BTESO are more elastic than the aromatic ring containing chains introduced by BTESEB.

The elastic structure of the membranes is helpful to proton transport. For all the samples, the proton conductivity increases with temperature up to 100° C., showing Arrhenius-type behavior. The average activation energy from room temperature to 100° C. has a tendency to decrease with increasing —$PO_3H_2$ group content. It was 0.71 eV for the membrane 2 MDSPPO-4 BTESEB-4 PETHS (—$PO_3H_2$/Si=4/10 in mole), and 0.27 eV for the membranes with higher —$PO_3H_2$ group contents. The latter value is comparable to that of Nafion® membranes, indicating that the new membranes have a similar conduction mechanism involving the hydronium ions.

Fuel Cell Test Result with Membrane (2 MDSPPO-4BTESO-6 HSMSFP) as Electrolyte

For a fuel cell test, a membrane-electrodes assembly (MEA) used a new polymer membrane as the electrolyte and commercially available Pt-loaded carbon paper (1 mg/cm²) as electrodes (anode and cathode). The MEA was obtained by hot-pressing the polymer membrane between the electrodes at 100° C. under about 110 bar for 2 minutes.

The new hybrid inorganic-organic copolymer membranes were tested in a fuel cell using $H_2$ as fuel and $O_2$ as oxidant which were saturated with water vapor at the same temperature at which the fuel cell was run. The thickness of the membranes was about 200 μm. The fuel cell was run in atmospheric pressure.

Figure 7:
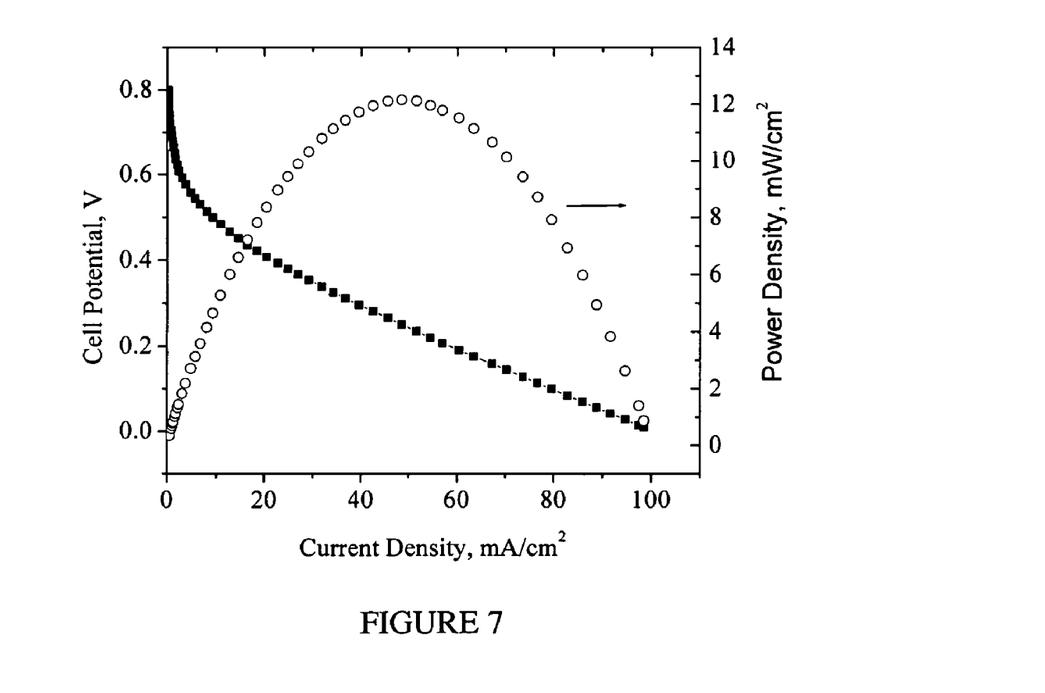
FIG. 7 shows cell voltage and power density versus current density of a single cell based on a membrane with a composition of 2 MDSPPO-4 BTESO-6 HDMSFP, measured at 80° C. under ambient pressure ($H_2/O_2$ bubbled with water vapor at 80° C.).

FIG. 7 shows the curves of voltage-current and power density-current at 80° C. with a membrane 2 MDSPPO-4BTESO-6 HSMSFP as the electrolyte. The open-circuit voltage is about 0.8 V and the power density is 12.2 mW/cm$^2$ at 80° C. Much higher performance is expected by optimized the membrane-electrode-assembly (MEA) and the running conditions. The cell voltage and power density versus current density of 2 MDSPPO-4BTESO-6 HSMSFP was obtained at 80° C. under ambient pressure. ($H_2/O_2$ bubbled with water vapor at 80° C.) temperature).

Fuel cells can be made using other improved membranes described in this specification, and with different MEA configurations, and different fuels (such as methanol, ethanol, other alcohol, water, other sources of hydrogen, or other compound or mixture) as known in the art.

Composite Membranes of Organosilicon Polymers and Basic Polymers

The PBI-$H_3PO_4$ system, an acid-based polymer membrane, provides high proton conductivity and good mechanical properties. The PBI-$H_3PO_4$ system is very promising for fuel cell applications. However, because the mobile $H_3PO_4$ may leak out, and also cause flooding and corrosion of the electrodes, the long-term stability and reliability of these types of membranes are questionable.

A silicon-containing compound (silicon compound) having a phosphonic acid group linked through a linking group to a silyl group, for example as described herein in this specification, can be used to form an organosilicon polymer having phosphonic acid groups within side chains. The sidechains comprise the linking group and the acid group, and are attached to a hybrid organic-inorganic matrix comprising silicon atoms and organic chains.

By adding hydrolyzed precursors in different ratios to other polymers in the solution, acid-base polymer membranes of various compositions can be provided. In these types of membranes, phosphonic acid groups are immobilized. At the same time, the flexible polysiloxane backbones provide good local mobility for the attached phosphonic acid groups. Therefore, these kinds of membranes provide good proton conductivity, and also solve the problems associated with mobile $H_3PO_4$ molecules.

Hence, polymer membranes can be formed including polymer systems including acid groups, combined with basic polymers, for example as a composite.

Basic polymers include, but are not limited to, polybenzimidazole (PBI), poly(silamine) (PSA), poly(ethylene imine) (PEI), poly(2,5-benzimidazole), poly(decamethylene carboxamide) (Nylon), poly(bis(trifluoroethoxy)phosphazene), polyurethane, polyacryamide (PAAM), and other polymers.

Additional Groups Bound to the Hybrid Inorganic-Organic Matrix

As described in a co-pending applications, proton conductivity can also be enhanced by attaching proton solvent groups, such as groups providing at least one lone pair of electrons, to the hybrid organic-inorganic matrix by flexible branches. The flexible branches can be organic chains such as hydrocarbon chains, for example alkyl groups. Example groups include nitrogen-containing heterocycles. Nitrogen-containing heterocycles include aromatic heterocycles, for example imidazole groups and derivatives thereof. Such nitrogen-containing heterocycles or other lone-pair providing groups can be included in a polymer according to the present invention along with acid groups discussed herein.

Hence, an inorganic-organic hybrid matrix can include bound acid groups as well as bound nitrogen-containing heterocycles (such as imidazole). The acid groups can act as proton source, and the heterocycle (or other lone-pair providing group) enhances proton conductivity.

Other groups can be attached to a hybrid matrix, such as amide groups (such as bissulfonylamide groups).

As discussed in another of our pending applications, polymers may also include halogenated heterocycles, for example fluorinated imidazoles. Examples of fluorinated imidazoles are described in U.S. Prov. App. Ser. No. 60/539, 641, the entire contents of which is incorporated herein by reference.

Additional Components

Ion conducting membranes can be made including copolymers such as those described herein, and additional components provided to improve one or more characteristics of the membrane. For example, additional components may be included to improve mechanical properties, ion conductivity, or some other property or properties.

Additional components which can be included to improve conductivity can include free acid molecules (such as $H_3PO_4$), proton-conductive inorganic compounds (such as $Zr(HPO_4)_2H_2O$ and silicotungstic acid ($SiO_2 12WO_3 26H_2O$)), other solid acids, perfluorosulfonic polymers such as Nafion®, and/or conducting particles (such as metal nanoparticles).

To improve conductivity and water resistance of the membranes, insoluble metal salts can be included. Example salts include phosphates (such as $CsH_2PO_4$, other alkali phosphates, other metal phosphates (such as $Zr(HPO_4)_2$), sulfates (such as $CsHSO_4$), other alkali metal salts (such as $CsHSO_4$), other inorganic salts, other acid salts, and the like.

Conductivity of membranes can also be improved by including one or more species of free acid molecules in addition to any acid groups bound to the matrix. Example acids include phosphoric acid $H_3PO_4$, sulfuric acid, a solid inorganic acid such as tungstophosphoric acid or molybdophosphoric acid, an organic acid such as a carboxylic acid, organic molecules substituted with one or more acid groups (such as phenylphosphoric acid and its derivatives, alkylphosphoric acid, and the like), halogenated acid molecules, superacids, and the like. The membranes may also contain added water. The term acid group includes acid salts which may be readily converted to an acid group, and ionized forms of acid groups.

Other polymers, for example in the form of fibers, webs, sheets, and the like, can be included for improvement of mechanical properties, as well as for other purposes. Thermally stable materials can be introduced into the matrix to make a material less brittle, such as a polymer, glass, ceramic, or other material, in the form of a grid, sheet, fiber, web, ring, branching structure, spiral, undulating form, or other form, and the like.

Polymers which may be added to reduce brittleness, and possibly increase conductivity, include fluorosulfonate ionomers such as Nafion™ discussed above, other ionomers, other polyelectrolytes, other fluoropolymers such as poly (vinylidene fluoride) or Teflon™, other thermopolymers, and/or polymers having nitrogen-containing heterocycles (such as polybenzimidazole, PBI). Plasticizers may also be included.

Proton conducting materials can include or be disposed on one or more reinforcing sheets, such as a web material. For example, a thermally stable material, for example in the form of a web or grid, may be included within a membrane or on its surface so as to improve the mechanical properties of the membrane. For example, a Nafion® grid or sheet may be provided to reduce membrane brittleness, to improve proton conductivity, or as a substrate.

Materials formed according to the present invention can further include particles such as metal-containing particles (such as nanometer-sized hygroscopic metal oxides), polymers dispersed through the membrane for improved mechanical properties as discussed above, main-chain polymers having atoms providing electron lone pairs within the main chain, other acid group containing polymers, dopants such as proton-conductive inorganic compounds, other non-polymer compounds including one or more acid groups (such as $-SO_3H$, $-PO_3H_2$), and/or other compounds having halogenated acid-containing groups (such as $-SO_2NHSO_2CF_3$, $-CF_2SO_3H$, and $-CF_2SO_2NHSO_2CF_3$, and the like). Other proton sources and proton solvents can also be included as additional components.

Hence, improved polymers according to examples of the present invention include a copolymer comprising the reaction product of a plurality of silicon compounds, each silicon compound including at least one silicon atom, including a first silicon compound including an organic chain, the organic chain having at least two carbon atoms; and a second silicon compound including at least one acid group, the acid group being linked to a silicon atom of the second silicon compound through a linking group, the linking group including an electron withdrawing group, so as to enhance the acidity of the acid group. For example, the linking group may comprise an alkyl chain which is at least partially fluorinated.

Example polymers also include a copolymer comprising a three-dimensional organic-inorganic hybrid matrix, including silicon atoms, oxygen atoms, and an organic chain; and an acid group chemically linked to the organic-inorganic hybrid matrix by a linking group.

A method of fabricating an improved polymer for use in a polymer electrolyte membrane comprises formation of a copolymer by providing a first precursor including an organic chain having at least two carbon atoms, the organic chain having a first end and a second end, the first end being attached to a first hydrolyzable silicon-containing group, the second end being attached to a second hydrolyzable silicon-containing group; providing a second precursor, the precursor including an acid group and a first functional group; forming a copolymer by copolymerizing at least the precursor and the second precursor, the copolymerization including hydrolysis of the first and second hydrolyzable silicon-containing groups, so as to produce a hybrid inorganic-organic matrix including silicon atoms and the organic chain, the acid group being linked to the hybrid inorganic-organic matrix by a linking group. The second precursor can include the linking group, the first functional group being a third hydrolyzable silicon-containing group connected to the acid group through the linking group. The linking group can be a partially fluorinated aliphatic hydrocarbon chain having 2 to 18 carbon atoms.

The method may further include the provision of a third precursor, the third precursor including a fourth hydrolyzable silicon-containing group and a second functional group, copolymerization including hydrolysis of the first, second, and fourth hydrolyzable silicon-containing groups, copolymerization further including a reaction of the first and second functional group, whereby the acid group is connected to the hybrid inorganic-organic matrix. The first and second functional groups can both be vinyl groups, or other double bond containing groups.

An example polymer can be formed by the copolymerization of at least a first silicon compound including an organic chain; a second silicon compound including a first functional group; and a third compound including a second functional group and an acid group, the copolymerization including at least partial hydrolysis of silicon-containing groups within the first and second silicon compounds so as to form an inorganic-organic hybrid matrix containing silicon atoms, oxygen atoms, and the organic chain, the copolymerization further including reaction of the first and second functional groups so as to attach the acid group to the inorganic-organic hybrid matrix.

An example polymer also comprises a hybrid inorganic-organic matrix having at least one backbone unit of the form $[-O-Si(A,B)-O-R-O-Si(C,D)-]$, wherein A,B,C,D each represent substituent groups, and R represents an organic chain including at least 2 carbon atoms, at least one substituent group including a linking group and a phosphonic acid group, the linking group connecting the phosphonic acid group to a silicon atom, the linking group including at least 2 carbon atoms. The linking group may include at least one C—F group, so as to increase the conductivity of the ion electrolyte.

An improved membrane may also be formed as composite of an acid-group containing polymer described herein with a basic polymer such as polybenzimidazole, poly(silamine), poly(ethylene imine), poly(2,5-benzimidazole), poly(decamethylene carboxamide), poly(bis(trifluoroethoxy)phosphazene), polyurethane, polyacryamide, other polyamide, other polyimide, derivatives or combinations of the aforementioned polymers, or other basic polymers.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Patents, patent applications, publications, or other documents mentioned in this specification are herein incorporated by reference to the same extent as if each individual document was specifically and individually indicated to be incorporated by reference. In particular, U.S. provisional patent applications Ser. No. 60/502,178, filed Sep. 11, 2003, and Ser. No. 60/511,836 filed Oct. 16, 2003, are incorporated herein in their entirety.

We claim:

1. A copolymer comprising the reaction product of a plurality of silicon compounds, each silicon compound including at least one silicon atom, the silicon compounds including:
   a first silicon compound including an organic chain, the organic chain having at least two carbon atoms; and
   a second silicon compound including at least one acid group, the acid group being linked to a silicon atom of the second silicon compound through a linking group, wherein the linking group includes an electron withdrawing group, so as to enhance the acidity of the acid group.

2. The copolymer of claim 1, wherein the acid group is a phosphonic acid group.

3. The copolymer of claim 2, wherein the linking group comprises an alkyl chain.

4. The copolymer of claim 3, wherein the alkyl chain is at least partially fluorinated.

5. The copolymer of claim 1, the organic chain having a first end and a second end, the first end being connected to a first silyl group, the second end being connected to a second silyl group.

6. The copolymer of claim 5, wherein the organic chain is a polypropylene oxide chain.

7. The copolymer of claim 5, wherein the organic chain is a hydrocarbon chain including at least two carbon atoms.

8. The copolymer of claim 1, wherein the plurality of silicon compounds includes a third silicon compound,
the third silicon compound being a silane derivative having at least one hydrolysable group.

9. The copolymer of claim 8, wherein the third silicon compound is an alkoxysilane.

10. The copolymer composition of claim 8, wherein the third silicon compound is tetraethoxysilane.

11. A polymer electrolyte membrane including the copolymer of claim 1.

12. A fuel cell including the polymer electrolyte membrane of claim 11.

13. A copolymer, comprising
a three-dimensional organic-inorganic hybrid matrix, including silicon atoms, oxygen atoms, and an organic chain; and
an acid group chemically linked to the organic-inorganic hybrid matrix by a linking group,
wherein the linking group further includes an electron-withdrawing group.

14. The copolymer of claim 13, wherein the electron-withdrawing group includes a halogen atom.

15. The copolymer of claim 13, wherein the linking group includes two or more carbon atoms.

16. The copolymer of claim 15, wherein at least one carbon atom within the linking group is halogenated.

17. The copolymer of claim 15, wherein at least one carbon atom within the linking group is fluorinated.

18. The copolymer of claim 13,
the acid group being a phosphonic acid group,
wherein the phosphorus atom of the phosphonic acid group is bound to a carbon atom of the linking group, the carbon atom of the linking group being fluorinated.

19. The copolymer of claim 13, the copolymer being formed from a plurality of precursors including a first precursor, the first precursor including the organic chain.

20. The copolymer of claim 19, wherein the organic chain of the first precursor has a first end and a second end, the first end being attached to a first silicon-containing group and the second end being attached to a second silicon-containing group.

21. The copolymer of claim 20, wherein the first silicon-containing group and the second silicon-containing group are both hydrolyzable silane derivatives, the copolymer being formed by a process including at least partial hydrolysis of both the first silicon-containing group and the second silicon-containing group.

22. The copolymer of claim 20, wherein the first silicon-containing group and the second silicon-containing group are both alkoxysilyl groups.

23. The copolymer of claim 20, wherein the organic chain is poly(propylene oxide) or a derivative thereof.

24. The copolymer of claim 20, wherein the plurality of precursors includes a second precursor, the second precursor including the acid group.

25. The copolymer of claim 24, wherein the second precursor includes a second precursor silicon-containing group, the linking group, and the acid group,
the copolymer being formed by a process including at least partial hydrolysis of the second precursor silicon-containing group.

26. The copolymer of claim 24, wherein the second precursor includes the acid group and a first functional group, the first functional group reacting with a second functional group so as to attach the acid group to the hybrid inorganic-organic matrix through a flexible linking group.

27. The copolymer of claim 26, wherein the second functional group is part of a third precursor, the third precursor including a third precursor silicon-containing group,
the copolymer being formed by a process including at least partial hydrolysis of the third precursor silicon-containing group.

28. The copolymer of claim 24, wherein the first and second functional groups are both vinyl groups.

29. A polymer electrolyte membrane including the copolymer of claim 13.

30. A fuel cell including the polymer electrolyte membrane of claim 29.

31. A method of fabricating polymer electrolyte membrane, the method comprising:
providing a first precursor including an organic chain having at least two carbon atoms, the organic chain having a first end and a second end, the first end being attached to a first hydrolyzable silicon-containing group, the second end being attached to a second hydrolyzable silicon-containing group, the organic chain including a polypropylene oxide chain:
providing a second precursor, the precursor including an acid group and a first functional group;
forming a copolymer by copolymerizing at least the precursor and the second precursor, the copolymerization including hydrolysis of the first and second hydrolyzable silicon-containing groups,
so as to produce a hybrid inorganic-organic matrix including silicon atoms and the organic chain, the acid group being linked to the hybrid inorganic-organic matrix by a linking group; and
fabricating the polymer electrolyte membrane using the hybrid inorganic-organic matrix.

32. The method or claim 31, wherein the acid group is a phosphorus-containing acid group.

33. The method of claim 31, wherein the acid group is a phosphonic acid group.

34. The method of claim 31, wherein the second precursor includes the linking group, the first functional group being a third hydrolyzable silicon-containing group connected to the acid group through the linking group.

35. The method of claim 34, wherein the linking group is a partially fluorinated aliphatic hydrocarbon chain having 2 to 18 carbon atoms.

36. The method of claim 31, further including provision of a third precursor,
the third precursor including a including a fourth hydrolyzable silicon-containing group and a second functional group,
copolymerization including hydrolysis of the first, second, and fourth hydrolyzable silicon-containing groups,
copolymerization further including a reaction of the first and second functional groups, wherein the acid group is connected to the hybrid inorganic-organic matrix.

37. The method of claim 36, wherein the first and second functional groups are both vinyl groups.

38. A copolymer formed by the copolymerization of at least:
- a first silicon compound including an organic chain;
- a second silicon compound including a first functional group; and
- a third compound including a second functional group and an acid group,
- the copolymerization including at least partial hydrolysis of silicon-containing groups within the the first and second silicon compounds so as to form an inorganic-organic hybrid matrix containing silicon atoms, oxygen atoms, and the organic chain,
- the copolymerization further including reaction of the first and second functional groups so as to attach the acid group to the inorganic-organic hybrid matrix,
- wherein the acid group is bound to the inorganic-organic hybrid matrix through a linking group, the linking group being an aliphatic hydrocarbon group having 2 to 18 carbons,
- the linking group including an electron withdrawing group.

39. The copolymer of claim 38, wherein the electron withdrawing group includes a fluorine atom.

40. A polymer comprising a hybrid inorganic-organic matrix having at least one backbone unit of the form —O—Si(A,B)—R—Si(C,D)—,
- wherein A,B,C,D each represent substituent groups, and R represents an organic chain including at least 2 carbon atoms,
- at least one substituent group including a linking group and a phosphonic acid group, the linking group connecting the phosphonic add group to a silicon atom,
- the linking group including at least 2 carbon atoms,
- the linking group including an electron withdrawing group.

41. The polymer of claim 40, wherein
the electron withdrawing group is a C—F group.

42. A composite of a first polymer with a basic polymer, wherein the first polymer comprises a hybrid inorganic-organic matrix having at least one backbone unit of the form —O—Si(A,B)—R—Si(C,D)—
- wherein A,B,C,D each represent substituent groups, and R represents an organic chain including at least 2 carbon atoms,
- at least one substituent group including a linking group and a phosphonic acid group, the linking group connecting the phosphonic acid group to a silicon atom,
- the linking group including at least 2 carbon atoms.

43. The composite or claim 42, wherein the basic polymer is selected from a group consisting of polybenzimidazole, poly(silamine), poly(ethylene imine), poly(2,5-benzimidazole), poly(decamethylene carboxamide), poly(bis(trifluoroethoxy)phosphazene), polyurethane, polyacryamide, and derivatives thereof.

44. An ion electrolyte comprising the polymer of claim 40.

* * * * *

UNITED STATES PATENT AND TRADEMARK OFFICE
CERTIFICATE OF CORRECTION

PATENT NO. : 7,183,370 B2 Page 1 of 1
APPLICATION NO. : 10/938268
DATED : February 27, 2007
INVENTOR(S) : Siwen Li et al.

It is certified that error appears in the above-identified patent and that said Letters Patent is hereby corrected as shown below:

Column 3, line 3, replace "providing" with --provided--

Column 8, line 36, delete "is"

Column 12, line 29, replace "illustrate" with --illustrates--

Column 15, line 21, replace "6=31" with --8=31--

Column 22, line 59, delete second occurrence of "including a"

Signed and Sealed this

Nineteenth Day of June, 2007

JON W. DUDAS
*Director of the United States Patent and Trademark Office*